United States Patent [19]

Giamello

[11] Patent Number: 5,671,661
[45] Date of Patent: Sep. 30, 1997

[54] EQUIPMENT FOR THE METERED SUPPLY OF ARRAYS OF PRODUCTS

[75] Inventor: Bruno Giamello, Alba, Italy

[73] Assignee: Soremartec S.A., Schoppach-Arlon, Belgium

[21] Appl. No.: 722,318

[22] Filed: Sep. 27, 1996

[30] Foreign Application Priority Data

Sep. 29, 1995 [CH] Switzerland .................. 2755/95

[51] Int. Cl.⁶ .................. A21C 9/00; A21C 9/08; A21C 11/16; A21D 6/00
[52] U.S. Cl. .................. 99/450.7; 99/353; 99/450.1; 99/450.6; 99/494; 425/294; 425/346
[58] Field of Search .................. 99/452–455, 494, 99/450.1–450.8; 425/346, 113, 113.1, 115, 291, 310; 426/275, 281, 94, 516, 502, 503

[56] References Cited

U.S. PATENT DOCUMENTS

| | | | |
|---|---|---|---|
| 3,566,805 | 3/1971 | Meyer | 99/450.6 |
| 3,615,675 | 10/1971 | Wisdom et al. | 99/450.7 X |
| 3,780,643 | 12/1973 | Papai | 425/346 X |
| 3,906,850 | 9/1975 | Papai | 99/352 X |
| 4,528,900 | 7/1985 | Simelunas | 99/450.7 |
| 4,618,498 | 10/1986 | Thulin | 426/275 |
| 4,643,904 | 2/1987 | Brewer et al. | 99/353 X |
| 4,671,759 | 6/1987 | Hayashi | 425/294 |
| 4,678,418 | 7/1987 | Thuylin | 425/115 |
| 4,698,000 | 10/1987 | Thulin et al. | 99/450.7 |
| 4,719,117 | 1/1988 | Simelunas | 99/450.1 |
| 4,741,916 | 5/1988 | Heidel et al. | 99/450.2 |

FOREIGN PATENT DOCUMENTS 0083324 7/1983 European Pat. Off. ......... A23G 3/20

*Primary Examiner*—Timothy F. Simone
*Attorney, Agent, or Firm*—Rothwell, Figg, Ernst & Kurz

[57] ABSTRACT

Product to be supplied in an ordered manner is supplied to the upstream end of an apparatus according to the invention, the bottom of which is substantially closed by a base plate that leaves only the extreme, downstream end of the apparatus open. The apparatus includes a belt-like structure composed of plates that are alternatingly apertured and non-apertured. Transverse partitions define compartments for receiving product at the upstream portion of the apparatus, the bottom portions of the compartments being bounded by the lower portion of the belt structure which, in turn, moves across the base plate. Product falls into the apertures in the apertured plates by means of gravity and pressure exerted by flexible lips located at the lower edges of the transverse partitions. The configuration ensures complete filling of the apertures in the apertured plates.

13 Claims, 2 Drawing Sheets

EQUIPMENT FOR THE METERED SUPPLY OF ARRAYS OF PRODUCTS

The present invention relates to equipment for the metered supply of arrays of products.

This equipment has been developed for its possible use in the metered supply of arrays of dry fruits (typically shelled hazel-nuts) intended to be used as fillings in food products such as confectionery products of the type described in the prior European Patent Application EP-A-0083324.

Confectionery products of this type comprise essentially a spherical wafer shell constituted by a pair of hemispherical shells kept adhering to each other by the mutual contact of their fillings.

These products are usually manufactured by placing one shell in a hemispherical cavity of a first die while the other shell is force-fitted into a cavity in a second die alongside the first die. After each shell has been filled with a filling which will adhere to the wafer, the second die is overturned on the first die to bring the two shells into mating contact, with the consequent closure of the product casing.

For organoleptic reasons, it is preferred to introduce a core constituted by a dry fruit, such as a shelled hazel-nut, into the filling.

On the industrial scale, this choice necessitates an operation being carried out in the line in which the dies containing the filled wafer shells advance in order to locate the dry fruits constituting the additional filling in the shells in every other die.

Usually the number of shells in each die is very large (for example of the order of 100) and the rate of advance of the dies on the respective conveyor lines, being commensurate with the production rate, is correspondingly high.

In order to satisfy this requirement, various solutions have been proposed in the past. The solutions have not, however, been entirely satisfactory from the qualitative point of view, particularly with regard to the possibility of a certain number of positions, although small, remaining empty, that is, there being shells in which, for various reasons, the dry fruit is not inserted. In the past, attempts have been made to overcome this problem by the provision of a control station immediately upstream of the station in which the dies are turned over on one another to complete the products, at which control station one or more operators act to insert the missing fillings manually.

Apart from other considerations, it has been found that, at least in some cases, the absence of dry fruit is not constant, but rather shows sane variability, with periods of more numerous absences that are difficult to overcome by manual intervention, even when able and attentive operators are available.

SUMMARY OF THE INVENTION

The present invention is directed towards upstream intervention to overcome the absences of fillings and to ensure that all the necessary fillings are available for insertion in the dies, in each case and at every moment in the process, Without any absences occurring.

Moreover, although developed for use as described above, the invention is, in fact, of general application in that its object is to provide equipment which is able to supply in a metered way arrays of products of any type (thus not only dry fruits intended for use as fillings), even if these are very densely packed and in large numbers, while avoiding as surely as possible the presence of "voids", that is even occasional absences of products in the array.

According to the present invention, this object is achieved by a device having the characteristics set forth in Claim 1.

DESCRIPTION OF THE DRAWINGS

The invention will now be described by way of non-limiting example, with reference to the appended drawings, in which.

DETAILED DESCRIPTION

Figure 1:
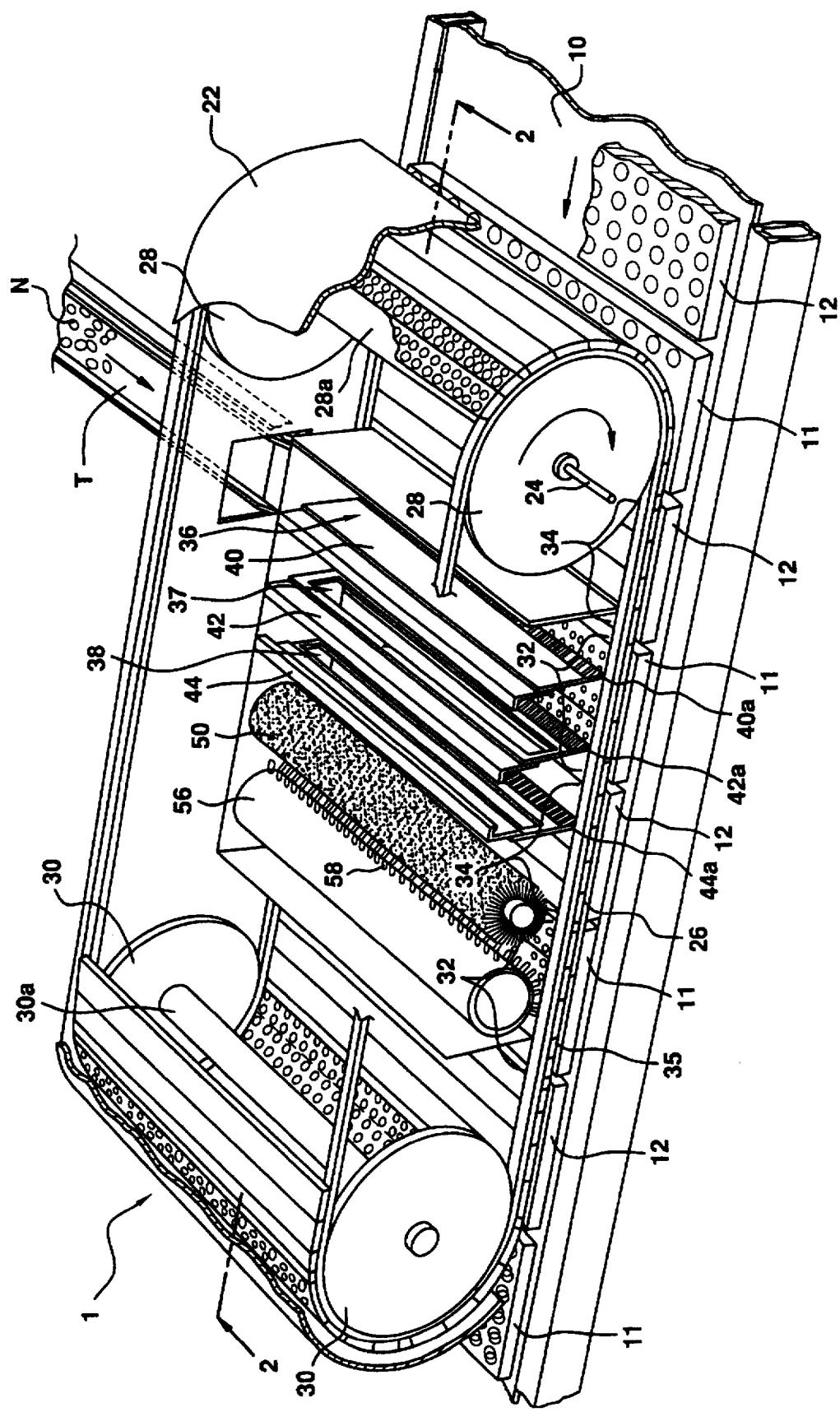
FIG. 1 is a perspective view of equipment according to the invention.
Figure 2:
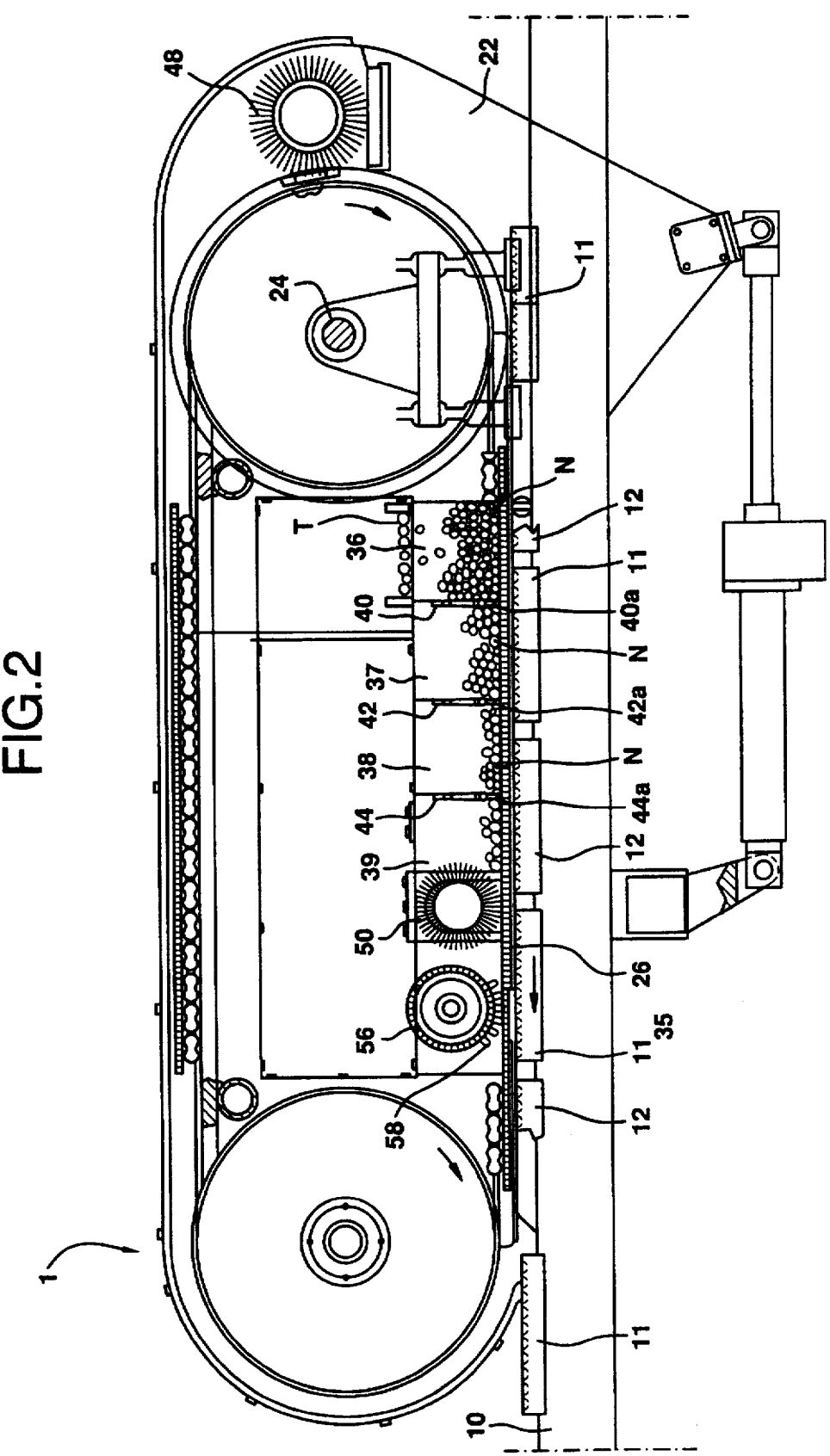
FIG. 2 is a section view taken along lines II—II in FIG. 1.

As stated above in the introduction to the present specification, the equipment of the invention, generally indicated 1, can be used, for example, in the process for the manufacture of confectionery products comprising a spherical wafer casing containing a creamy filling. The wafer casing is constituted by a pair of hemispherical shells kept together by the mutual contact of their respective fillings with the insertion therein of a dry fruit, such as a shelled hazel-nut, as an added element of the filling.

For a general description of the characteristics of a product of the type specified above and its method and manufacture, reference may usefully be made to the document EP-A-0083324 already mentioned in the present specification. This is true particularly with regard to the arrangement of pairs of complementary dies 11, 12 of which one of each pair is intended to be turned over on the other so as to close and complete the products.

In the solution described in EP-A-0083324, the insertion of the core constituted by a dry fruit is not explicitly explained. For an understanding of the invention it will, however, suffice to remember that, to achieve this result, it is necessary to arrange a corresponding array of dry fruits, e.g., shelled hazel-nuts N, in each of the shells located in alternating dies in a sequence, i.e., in one die but not the next.

The equipment 1 according to the invention has been illustrated in its normal position of use above a conveyor line 10 on which the dies 11 and 12 housing the shells intended to constitute each half of a finished product advance in alternating sequence, in accordance with known criteria, and therefore does not require further description here. It will be assumed below, however, that the shells in which the hazel-nuts N are to be inserted are those located in the dies indicated 11.

The equipment 1 of the invention is constituted essentially by a structure intended to be located like a bridge over the line 10 and which includes a pair of sides 22 which may be pivotable about an axis 24 transverse to the direction of advance of the line 10 to allow access to the part of the line beneath the equipment 1. The sides 22, together with a flat base plate 26 (also termed an abutment formation below), form a structure which may be defined essentially as a body to which the products N intended to serve as fillings are supplied. In the embodiment illustrated here, explicit reference is made to shelled hazel-nuts; it will, however, be understood that the invention is readily usable for the formation of an ordered array of products of any type, even outside the specific field of application indicated here.

The hazel-nuts N are supplied to the body of the equipment 1 by any known means, for example by a conveyor belt T which carries the products so that they fall into a part of the equipment located generally towards the upstream end relative to the direction of advance of the dies 11 and 12, which serve as receiver elements for the products N and which, as illustrated in the drawings, are moved from right to left by the line 10.

Two pairs of wheels or rollers indicated 28 and 30 are located at opposite ends of the body of the equipment 1. The rollers are connected in pairs by respective shafts 28a and 30a, and a belt structure passes around them. The belt structure is constituted by plates which are alternately blind, i.e., free from holes, and apertured, i.e., with holes whose geometric distribution reproduces the distribution of the cavities in the dies 11 and 12 for receiving the shells. The dimensions of the plates in question, indicated 32 (apertured plates) and 34 (blind plates) are thus such as to correspond with the dimensions of the dies 11 and 12. Preferably, neither the plates 32 nor the plates 34 are rigid elements, but rather comprises a plurality of articulated parts, like the slats of a roller blind, to facilitate their movements around the rollers 28 and 30 and to make these movements more precise.

Moreover, again for preference, the structure of the belt is continuous. Spacer slats (free from apertures), which have widths equal to the spacings between the dies 11 and 12 in the direction of advance of the line 10, are provided between the plates 32 and 34.

Those plates 32 and 34 of the belt structure which are in the lower pass of the belt at any time are thus advanced over the dies 11 and 12, immediately above them apart from the (partial) interposition of the base plate 26. The movement of the belt structure (which has associated drive means not illustrated explicitly) is controlled by the movement of the line 10, for example by a transmission connection of known type, such that the plates 32 and 34 advance in exact synchronization with the dies 11, 12. That is, the apertured plates 32 advance "in register" above the dies 11 while the blind plates 34 advance above the dies, 12.

The term "in register" has been used here to indicate a condition of exact vertical alignment, which means that the holes provided in the apertured plates 32 are exactly in line with the cavities in the dies 11.

As stated above, it is assumed here that the dies 11 are those in which the shells defining the "lower" parts of the products are located, that is, the parts in which the dry fruit fillings are to be inserted. The dies 12 are those intended to be turned over onto the dies 11 so as to complete the products, as described in EP-A-0083324.

It will be noted that the body of the equipment 1 is closed by the base plate 26 for a substantial portion of the length of its "upstream" part (reference is again made to the direction of advance of the dies 11 and 12 and, consequently, to the direction of advance of the plates 32 and 34 in the lower pass of the belt structure). The base plate does, however, have a window or opening 35 toward the downstream end of the equipment 1.

In particular, the part of the body of the equipment 1 located above the lower closed portion of the body (that is, the portion of the body enclosed by the wall 26) is divided into several sections or compartments indicated 36, 37, 38, and 39 respectively, in order from upstream to downstream of the equipment 1. The most upstream compartment 36 is the one to which the hazel-nuts N are supplied. The compartments 36, 37, 38, and 39 are bounded by transverse sheet-metal partitions, indicated 40, 42, and 44, in the body, the first partition preferably being continuous, and the other two partitions preferably being apertured and extending for a given height within the body 1. The partitions 40, 42, and 44 do not, however, reach the base plate 26, but are held at a certain distance (for example, a couple of centimeters in the embodiment illustrated here for supplying and metering hazel-nuts N) from this plate. At their lower edges, the partitions 40, 42, and 44 each have a flexible lip, indicated 40a, 42a, and 44a respectively, made from soft rubber or flexible sheet metal.

A rotary brush indicated 48, preferably motor driven, cleans the plates 32, 34 of any nut residues before the plates are returned to the compartments 36, 37, 38, and 39.

In correspondence with these compartments, the plates 32 and 34 are advanced through the base regions of the compartments 36, 37, 38, and 39 above the base plate 26. The hazel-nuts N located in these compartments may fall freely into the holes in the apertured plates 32.

Usually, the nuts fall so as to fill nearly all the holes in a given plate 32 while that plate is in correspondence with the most upstream compartment indicated 36. Any remaining spaces, however, may easily be filled as the plates move beneath the compartments 37, 38, and 39, which always contain a certain quantity of nuts N that are transferred from the compartment 36 by means of entrainment by the plates particularly the apertured plates 32 and the nuts in the apertures thereof acting against the small retaining force exerted by the lips 40a, 42a, and 44a and, possibly, by means of overflow of the nuts N through the apertures in the partitions 42 and 44 induced by the movement of the belt structure. Moreover, the lips 40a, 42a, and 44a cause a certain degree of resilient pressure to be exerted on the nuts N so as to force them into any holes 32 which might still be empty.

A rotary brush 50 mounted in the most downstream compartment, indicated 39, prevents any nuts N which might be in this compartment from being drawn further downstream. For this purpose, the brush 50 is rotated by drive means (not illustrated) in the opposite sense from the sense of rotation of the belt, that is, counter clockwise as illustrated in the drawings.

Level sensors (not illustrated but of known type) located inside the chamber 36 as well as inside the chamber 39 enable the supply of hazel-nuts N to the compartment 36 furthest upstream to be regulated selectively so as to avoid any undesirable accumulation of nuts.

In any case, due to the combined action of entrainment and forcing of the nuts N described above, all the holes in the apertured plates 32 which reach the most downstream end of the body of the device 1, where the base plate 26 is interrupted, are filled with the nuts N with certainty.

Consequently, when the plates 32 move so as to be located over the dies 11 and in correspondence with the opening or window 35 where there is no base plate 26, the nuts N which are located in all the holes, there being no voids in the array in any plate 32, pass directly into the shells in the underlying die 11.

This falling movement may occur either under gravity, to the extent that the peripheries of the holes in the plate 32 do not exert any retaining force on the nuts N, or by the action of a rotary pusher element 56. The rotary pusher element is constituted essentially by a roller which rotates in the concordant sense and in synchronization with the belt of plates 32 and 34 and has, at least on its periphery, an array of finger-like pusher elements 58. The movement of the roller 56 is controlled (for example through a mechanical transmission) by the movement of the belt of plates 32 and 34 and/or the movement of the line 10. At the same time, the pusher elements 58, which extend radially from the roller 56, are arranged in an array to correspond exactly identically and homologously to the array of holes in the plates 32, and hence to the array of cavities in the dies 11. This so as enables them to penetrate the holes in the plates 32 and give a positive, downward push to any hazel-nuts N therein which do not fall into the underlying die 11 simply under gravity.

Whatever means cause the nuts to transferred into the underlying dies 11, the solution of the invention ensures that hazel-nuts N are present in all of the shells in the die 11, as is desired, without any being missing. This has been proven experimentally by the Applicant in mass production at high production rates.

It will be appreciated that numerous aspects of the structure described above are given purely by way of example.

In particular, the fact that the plates 32 and 34 are arranged in an alternating sequence of apertured and unapertured plates results strictly from the specific example of use in which the dies 11 and 12 must receive the nuts N, or not receive them, in alternating fashion.

Clearly, if the requirements for the supply of the product—here given by way of example as the hazel-nuts N—were to differ, the arrangement of the plates could be different; for example, all the plates might be apertured.

Furthermore, although the embodiment in which the plates 32 and 34 are arranged as a closed loop structure, i.e. as a belt, is preferred, it is not imperative. The same functional effect described above could, in fact, be achieved in a different manner, for example by moving the plates 32 and 34 linearly, following the movements of the dies 11 and 12, and, once the products N have been supplied to the dies themselves, following a return path towards a collection zone for the products N.

Conversely, instead of the plates 32 and 34 being moved relative to an abutment formation constituted by the plate 26, the same relative movement described above could be achieved by moving a plurality of such plates 26.

Furthermore, the plates 32 and 34 could be replaced by elements of a different type, for example grids, etc.

Other embodiments will occur to those having skill in the art and are deemed to be within the scope of the following claims.

What is claimed is:

1. An apparatus for the metered provision of product arranged in an array, said apparatus comprising:

a generally flat abutment structure having an upstream portion and a downstream portion;

partitions disposed above and extending generally transverse to said abutment structure and, in cooperation with said abutment structure, defining a plurality of compartments arranged along at least a portion of said abutment structure for receiving said product, said partitions having resiliently flexible lips extending generally adjacent to an upper surface of said abutment structure; and at least one apertured plate having apertures extending therethrough for receiving a supply of said product, said apertures being arranged in a manner corresponding to said array, said apertured plate being movable relative to said upper surface of said abutment structure, from said upstream portion to said downstream potion, so as to pass from one compartment to another through bottom portions of said compartments, said apertured plate and said abutment structure disengaging from each other at or near said downstream portion;

whereby, in operation, product received in at least one of said compartments is introduced into said apertures by means of gravity and by means of force exerted on said product by said resiliently flexible lips as said apertured plate moves from one compartment to another such that, when said apertured plate reaches said downstream portion and disengages from said abutment structure, substantially all of said apertures contain said product.

2. The apparatus of claim 1, wherein said apparatus includes a plurality of apertured plates connected together to form a continuous, loop-form belt of apertured plates.

3. The apparatus of claim 1 or 2, wherein said abutment structure comprises a flat plate.

4. The apparatus of claim 1 or 2, further comprising means for supplying said product to the one of said compartments located furthest upstream relative to the direction in which said at least one apertured plate moves relative to said upper surface of said abutment structure.

5. The apparatus of claim 1 or 2, further comprising a pusher member located at or near the downstream portion of said abutment structure, said pusher member having a plurality of pusher formations arranged to correspond to the arrangement of the apertures in said at least one apertured plate, the arrangement of said pusher formations being such that, when said at least one apertured plate reaches the downstream portion of said abutment structure, said pusher formations enter the apertures in said at least one apertured plate to expel product disposed within said apertures.

6. The apparatus of claim 5, wherein said pusher member comprises a roller which rotates in a manner synchronized with advancing movement of said at least one apertured plate from said upstream portion to said downstream portion of said abutment structure and said pusher formations comprise radially oriented, finger-like members extending from the surface of said roller.

7. The apparatus of claim 1 or 2, said apparatus comprising a plurality of said apertured plates and a plurality of blind, non-apertured plates movable relative to the upper surface of said abutment structure, said apertured plates and said non-apertured plates being arranged in alternating fashion.

8. The apparatus of claim 1 or 2, further comprising at least one receiving member for receiving product from said at least one apertured plate, said at least one receiving member having a plurality of cavities arranged in a manner corresponding to said array and to the arrangement of the apertures in said apertured plate, said at least one receiving member being movable relative to said abutment structure in a manner that is synchronized with advancing movement of said at least one apertured plate from said upstream portion to said downstream portion, whereby product can be transferred from said apertures to said cavities when said apertured plate and said receiving member reach said downstream portion.

9. The apparatus of claim 1 or 2, said apparatus further comprising a plurality of said apertured plates and a plurality of blind, non-apertured plates movable relative to the upper surface of said abutment structure, said apertured plates and said non-apertured plates being arranged in alternating fashion;

a plurality of receiving members for receiving product from said plurality of apertured plates, said receiving members having pluralities of cavities arranged in a manner corresponding to said array and to the arrangement of the apertures in said apertured plates; and a plurality of blind, non-cavity-containing members, said receiving members and said blind, non-cavity-containing members being arranged in alternating fashion;

said receiving members and said non-cavity-containing members being movable relative to said abutment structure in a manner that is synchronized with advancing movement of said apertured plates and said non-apertured plates from said upstream portion to said downstream portion, whereby product can be transferred from said apertures to said cavities when said apertured plates and said receiving members reach said downstream portion.

10. The apparatus of claim 2, wherein said apertured plates comprise a plurality of articulated slats.

11. The apparatus of claim 7, wherein said apertured plates and said non-apertured plates comprise pluralities of articulated slats.

12. The apparatus of claim 1 or 2, further comprising mean for preventing passage of said product out of the one of said compartments located furthest downstream relative to the direction in which said at least one apertured plate moves relative to said upper surface of said abutment structure.

13. The apparatus of claim 12, wherein said means for preventing comprises a rotary brush disposed within said one of said compartments located furthest downstream, said rotary brush rotating such that a surface portion thereof which is closest to said at least one apertured plate moves, tangentially, opposite the direction in which said at least one apertured plate moves.

* * * * *

UNITED STATES PATENT AND TRADEMARK OFFICE
CERTIFICATE OF CORRECTION

PATENT NO. : 5,671,661
DATED : September 30, 1997
INVENTOR(S) : Bruno Giamello

It is certified that error appears in the above-indentified patent and that said Letters Patent is hereby corrected as shown below:

Col. 1, between lines 3-4, insert -- BACKGROUND OF THE INVENTION --; Col. 4, line 36, "counter clockwise" should be -- counter-clockwise --; Col. 5, line 2, delete "so as"; Col. 5, line 7, after "nuts to" insert -- be --.

Signed and Sealed this

Twenty-eighth Day of April, 1998

Attest:

*Attesting Officer*

BRUCE LEHMAN

*Commissioner of Patents and Trademarks*